(12) United States Patent
Allen et al.

(10) Patent No.: US 11,686,323 B2
(45) Date of Patent: Jun. 27, 2023

(54) WEATHERPROOF CEILING FAN

(71) Applicant: HUNTER PACIFIC INTERNATIONAL PTY LTD, Mount Kuring-Gai (AU)

(72) Inventors: Philip Allen, Mount Kuring-Gai (AU); Zhao Jian Quan, Jiang Men (CN)

(73) Assignee: Hunter Pacific International Pty Ltd, Mount Kuring-Gai (AU)

( * ) Notice: Subject to any disclaimer, the term of this patent is extended or adjusted under 35 U.S.C. 154(b) by 0 days.

(21) Appl. No.: 16/993,612

(22) Filed: Aug. 14, 2020

(65) Prior Publication Data

US 2021/0048039 A1    Feb. 18, 2021

(51) Int. Cl.
| | |
|---|---|
| F04D 29/52 | (2006.01) |
| F04D 25/06 | (2006.01) |
| F04D 29/08 | (2006.01) |
| F04D 29/043 | (2006.01) |
| H02K 5/10 | (2006.01) |
| H02K 7/08 | (2006.01) |
| F04D 25/08 | (2006.01) |
| F04D 29/64 | (2006.01) |

(52) U.S. Cl.
CPC .......... *F04D 29/522* (2013.01); *F04D 25/06* (2013.01); *F04D 25/088* (2013.01); *F04D 29/043* (2013.01); *F04D 29/083* (2013.01); *F04D 29/646* (2013.01); *H02K 5/10* (2013.01); *H02K 7/085* (2013.01)

(58) Field of Classification Search
CPC .... F04D 25/088; F04D 29/083; F04D 19/002; F04D 25/06; F04D 29/043; F04D 29/522; F04D 29/601; F04D 29/646; F04D 29/703; F04D 25/062; F04D 25/064; F04D 25/0646; H02K 5/10; H02K 7/085; H02K 2213/03; H02K 7/083; H02K 7/14
See application file for complete search history.

(56) References Cited

U.S. PATENT DOCUMENTS

| | | | | |
|---|---|---|---|---|
| 4,592,702 A * | 6/1986 | Bogage | ................. | F04D 25/088 416/247 R |
| 5,135,365 A * | 8/1992 | Bogage | ................. | F04D 25/088 416/244 R |
| 5,507,619 A * | 4/1996 | Ryan | .................... | F04D 25/088 416/244 R |
| 5,899,663 A * | 5/1999 | Feder | ...................... | F04D 29/34 416/5 |
| 6,382,917 B1 * | 5/2002 | Zuege | ................... | F04D 25/088 416/210 R |
| 2001/0022937 A1 * | 9/2001 | Bucher | ................. | F04D 25/088 416/244 R |
| 2011/0165002 A1 * | 7/2011 | Noble | ................... | F04D 19/002 417/423.7 |
| 2013/0136632 A1 * | 5/2013 | Stocks | ................. | F04D 25/088 417/410.1 |
| 2016/0363377 A1 * | 12/2016 | Rollins | ..................... | F28B 1/06 |
| 2017/0204869 A1 * | 7/2017 | Horng | .................. | F04D 29/601 |
| 2019/0113041 A1 * | 4/2019 | Walker, Jr. | ............ | F04D 29/601 |

* cited by examiner

*Primary Examiner* — Dominick L Plakkoottam
(74) *Attorney, Agent, or Firm* — Schroeder Law PC

(57) ABSTRACT

An electric ceiling fan that is suitable for safe operation in outdoor conditions and is capable of being subjected to high pressure washing without damage.

4 Claims, 2 Drawing Sheets

WEATHERPROOF CEILING FAN

TECHNICAL FIELD

The invention relates to the field of manufacture of electrical ceiling fans and the like. In particular, the invention relates to an improved ceiling fan that is capable of safe operation in open weather.

BACKGROUND OF THE INVENTION

Ceiling fans have traditionally been used indoors. However, as modern lifestyles have tended toward taking living areas outdoors, it has been required that ceiling fans be able to operate in a more challenging environments with respect to dust and water ingress, and also therefore with respect to cleaning of the type of dirt, dust, bird droppings etc. that may accumulate on the fan in these conditions.

Accordingly, some efforts have been made to construct ceiling fans that can operate in semi-outdoor conditions, such as open patios that typically have a roof but may be fully or partly open to the environment at the sides. Such fans are required to be capable of being used in unenclosed patio areas and the like and to be gently washed.

Some of these fans have been manufactured to meet the International Electrotechnical Commission (IEC) standard rating of ingress protection known as IP55. This requires the fan to be resistant to dust ingress to the extent that ingress of dust is not entirely prevented, but it must not enter in sufficient quantity to interfere with the satisfactory operation of the equipment. This also requires that the fan is resistant to liquid to the extent that water projected by a nozzle (6.3 mm) against enclosure from any direction shall have no harmful effects.

The formal test for IP55 liquid ingress is: 1 minute per square meter for at least 15 minutes; water volume of 12.5 litres per minute at a pressure of 30 kPa at distance of 3 metres.

However, such fans are not satisfactorily capable of operating in fully outdoor conditions, such as in completely open weather. Also, such fans are not capable of being cleaned via high pressure hoses.

Accordingly, it is an object of the invention to provide a ceiling fan that ameliorates at least some of the problems associated with the prior art.

SUMMARY OF THE INVENTION

According to a first aspect of the invention, there is provided a ceiling fan that is suitable for safe operation in outdoor conditions and is capable of being subjected to high pressure washing without damage; wherein said fan includes an electrical rotor and stator that are sealed within a two part cover having upper and lower parts; and wherein a sealing gasket is located between said upper and lower parts.

Preferably, said electrical rotor has an upwardly extending motor shaft; and wherein said rotor and stator are suspended from a downrod via an intermediately disposed down rod jointer that is adapted to receive and engage, at its upper end, the downrod, and to receive and engage, at its lower end, the motor shaft.

Preferably, there is located, between said down rod jointer and said down rod, a gasket seal.

Preferably, said ceiling fan incorporates a bearing located around said motor shaft and above said stator; further incorporating a dust cover above said bearing and upper cover part.

A ceiling fan constructed as defined above has a capability of meeting the International Electrotechnical Commission (IEC) standard rating of ingress protection known as IP66.

An IP66 rating represents an ingress resistance rating of an enclosure against: for solid particles such as dust, complete protection against contact (dust tight), i.e. a vacuum must be applied under a test duration of up to 8 hours based on air flow; and for liquid, complete resistance to water projected in powerful jets (12.5 mm nozzle) against the enclosure from any direction. The water test involves: 1 minute per square meter for at least 3 minutes, water volume of 100 litres per minute at a pressure of 100 kPa at distance of 3 metres.

This allows the ceiling fan according to the invention be operated wholly outdoors and under exposure to normal weather conditions. It also allows the fan to be cleaned without damage by a pressure hose, such as a Gerni™.

While some ceiling fans in the prior art are claimed to be able to meet the lesser IP55 standard, the inventor is not aware of any other prior art ceiling-type fan that is capable of meeting the IP66 standard.

According to another aspect of the invention, there is provide a method of making a ceiling fan, that includes an electrical rotor and stator, safe for operation in outdoor conditions and capable of being subjected to high pressure washing without damage, said method including the steps of sealing said rotor and stator within a two part cover having upper and lower parts; and placing a sealing gasket is located between said upper and lower parts.

Now will be described, by way of a specific, non-limiting example, a preferred embodiment of the invention with reference to the drawings.

DETAILED DESCRIPTION OF THE INVENTION

The invention resides in a specific construction of a ceiling fan that allows it to resist ingress of dust particles and water to the standard required by IP66 as per the IEC.

An IP66 rating represents an ingress resistance rating of an enclosure against: for solid particles such as dust, complete protection against contact (dust tight), i.e. a vacuum must be applied under a test duration of up to 8 hours based on air flow; and for liquid, complete resistance to water projected in powerful jets (12.5 mm nozzle) against the enclosure from any direction. The water test involves: 1 minute per square meter for at least 3 minutes, water volume of 100 litres per minute at a pressure of 100 kPa at distance of 3 metres.

A typical non-IP66 or non-IP55 rated ceiling fan has the following construction. The rotating fan hub is suspended from the ceiling via a downrod. Inside the hub resides the electric motor, consisting essentially of a rotor and a stator. A drive rod will extend upward from the stator. The motor and stator are enclosed by a cover that is held in place by screws, with a hole in the upper part of the cover for the drive rod. The downrod is connected directly to the drive rod, usually by a screw thread engagement. One or more rotating bearings are typically located between the rotor and the motor shaft.

A number of enhancements have been made, according to the present invention, to the fan construction described above in order to achieve IP66 compliance.

Broadly speaking, the enhancements are: enclosing the motor in a two-part casing that is sealed via a gasket; the placement of a downrod jointer between the downrod and the motor shaft; placing a gasket seal between the downrod and the downrod jointer; placing a bearing dust cover between the motor bearing and downrod jointer; placing a cover over the jointer and sealing the gap between the jointer and the cover with a rubber (or similar) ring such as an O-ring.

Figure 1:
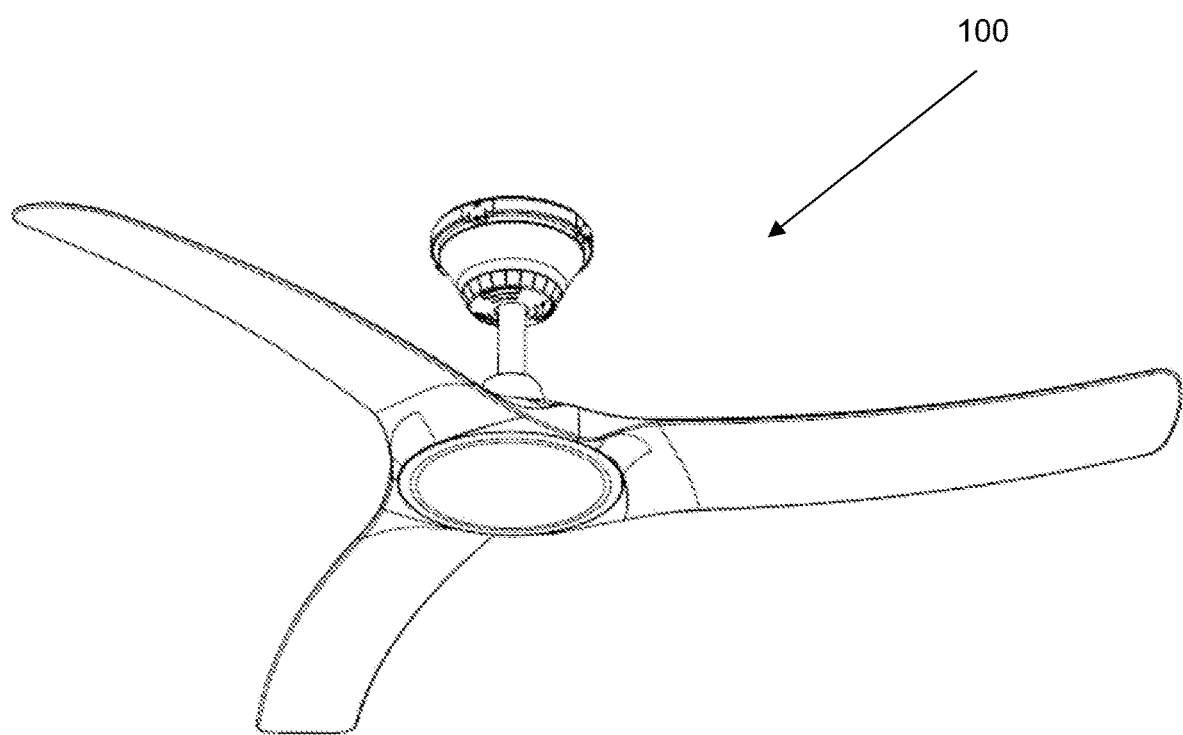
FIG. 1 is an external view of a ceiling fan according to the invention.

Turning to FIG. 1, there is shown a ceiling fan 100 according to the invention.

Figure 2:
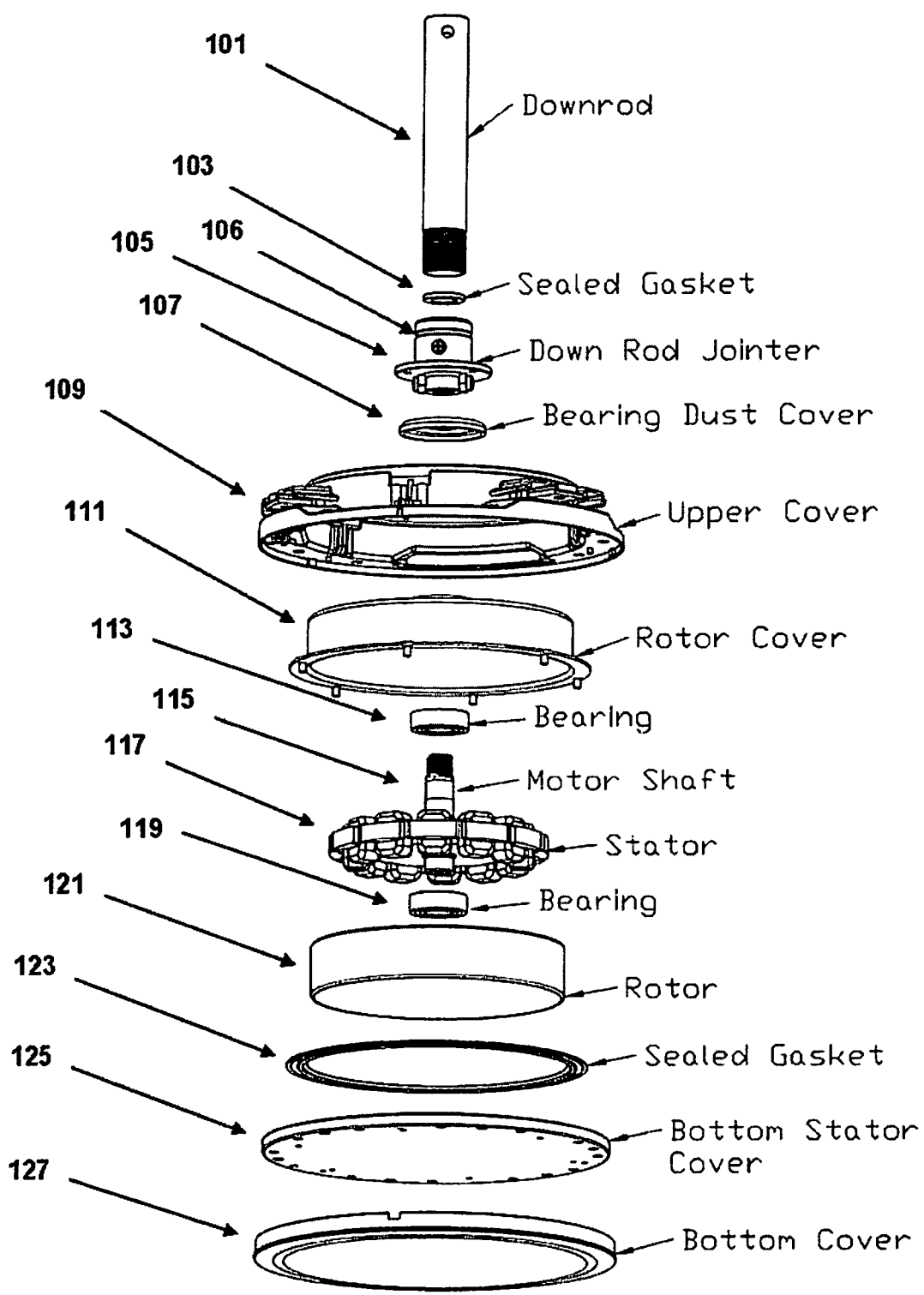
FIG. 2 is an exploded view of the ceiling fan of FIG. 1.

Turning to FIG. 2, there is shown an exploded view of the fan according to the invention. Not all of the features of the fan 100 of FIG. 1 are shown, such as the fan blades or the cover that sits atop the central hub. What is shown is the central drive mechanism and the parts that make up this mechanism.

As can be seen from FIG. 2, the motor stator 117 has a motor shaft 115 extending upwards from it. Bearings 113, 119 are placed both below and above the stator 117 and the rotor 121 is located around the stator 117. The rotor 121, stator 117 and bearings 113, 119 are encased between a rotor cover 111 and a bottom stator cover 125. In between these covers is located a sealing gasket 123.

An upper cover 109 is located over the rotor cover 111. The motor shaft 115 extends through an aperture in the rotor cover 111 and in said upper cover 109, and is connected at its upper end to a downrod jointer 105. A bottom cover 127 is located below the bottom stater cover 125.

The downrod jointer 105 is disposed between the motor shaft 115 and the down rod 101. The downrod jointer 105 is a device that is adapted to receive the lower end of the downrod 101 in an upper barrel, and is adapted at its lower end to receive the upper end of the motor shaft 115. Both the downrod 101 and the motor shaft 115 make a threaded screw engagement with the jointer 105. A sealing gasket 103 is further provided in between the downrod 101 and the jointer 105.

The jointer 105 also has a groove 106 running around the outside of the upper barrel that is adapted to receive an O-ring or similar sealing part, which in turn is designed to make a sealing engagement with the inside of a jointer cover (not shown).

A bearing dust cover 107 is placed over the upper bearing.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. An electric ceiling fan that is suitable for safe operation in outdoor conditions and is capable of being subjected to high pressure washing without damage in accordance with an IP66 standard rating defined by the International Electrotechnical Commission (IEC); wherein said fan comprises an electrical rotor and stator that are sealed within a two part cover having a rotor cover and a bottom stator cover; and wherein a sealing gasket is located between said rotor cover and said bottom stator cover; and wherein said electrical rotor has an upwardly extending motor shaft; and wherein said rotor and stator are suspended from a downrod via an intermediately disposed down rod jointer that is adapted to receive and make sealing engagement, at its upper end with the downrod, and to receive and engage, at its lower end, said motor shaft; and wherein said downrod jointer has a groove running around the outside of said upper end that is adapted to receive an O-ring or similar sealing part, which is adapted to make a sealing engagement with the inside of a jointer cover or canopy, and wherein there is located, between said down rod jointer and said down rod, a gasket seal; and wherein said fan further comprises upper and bottom covers located respectively above and below said rotor cover and said bottom stator cover of said two part cover.

2. The ceiling fan of claim 1, incorporating a bearing located around said motor shaft and above said stator; further incorporating a dust cover above said bearing and rotor cover.

3. A method of making an electric ceiling fan, said ceiling fan including an electrical rotor and stator, wherein said electrical rotor has an upwardly extending motor shaft; and wherein said rotor and stator are suspended from a downrod, safe for operation in outdoor conditions and capable of being subjected to high pressure washing without damage in accordance with an IP66 standard rating defined by the International Electrotechnical Commission (IEC), said method including the steps of: sealing said rotor and stator within a two part cover having a rotor cover and a bottom stator cover and placing a sealing gasket between said rotor cover and said bottom stator cover; and the step of intermediately disposing a down rod jointer between said down rod and said motor shaft, wherein said down rod jointer is adapted to receive and engage, at its upper end, the downrod, and to receive and engage, at its lower end, the motor shaft, and wherein said downrod jointer has a groove running around the outside of said upper end that is adapted to receive an O-ring or similar sealing part, which is adapted to make a sealing engagement with the inside of a jointer cover or canopy, and further including the steps of placing a gasket seal between said down rod jointer and said down rod; and placing upper and bottom covers respectively above and below said rotor cover and said bottom stator cover of said two part cover.

4. The method of claim 3, incorporating a bearing located around said motor shaft and above said stator; further incorporating a dust cover above said bearing and rotor cover.

* * * * *

UNITED STATES PATENT AND TRADEMARK OFFICE
CERTIFICATE OF CORRECTION

| | |
|---|---|
| PATENT NO. | : 11,686,323 B2 |
| APPLICATION NO. | : 16/993612 |
| DATED | : June 27, 2023 |
| INVENTOR(S) | : Allen et al. |

It is certified that error appears in the above-identified patent and that said Letters Patent is hereby corrected as shown below:

On the Title Page

Please insert Item (30) the following priority claim:
--Foreign Application Priority Data
Aug. 14, 2019 (AU)..........................2019902939--

Signed and Sealed this
Third Day of September, 2024

Katherine Kelly Vidal
*Director of the United States Patent and Trademark Office*